(12) United States Patent
Peng-Tan

(10) Patent No.: US 6,392,216 B1
(45) Date of Patent: May 21, 2002

(54) METHOD FOR COMPENSATING THE NON-UNIFORMITY OF IMAGING DEVICES

(75) Inventor: Yap Peng-Tan, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/364,368

(22) Filed: Jul. 30, 1999

(51) Int. Cl.$^7$ .............................. H01J 40/14; H04N 3/14
(52) U.S. Cl. ................................. 250/208.1; 348/294
(58) Field of Search ...................... 250/208.1; 348/231, 348/294, 308, 362, 364, 366; 358/513, 519, 520, 523, 525

(56) References Cited

U.S. PATENT DOCUMENTS 5,252,818 A * 10/1993 Gerlach et al. .......... 250/208.1
5,778,106 A * 7/1998 Juenger et al. ............. 382/275

* cited by examiner

Primary Examiner—Stephone Allen
(74) Attorney, Agent, or Firm—Blakely, Sokoloff, Taylor & Zafman LLP

(57) ABSTRACT

A method and apparatus for compensating non-uniformity of imaging response is described. A plurality of locations on the imaging device is selected. The light intensity for each of the selected location is measured. The measured light intensities are normalized using a reference light intensity and the normalized light intensities are stored in a memory.

28 Claims, 4 Drawing Sheets

METHOD FOR COMPENSATING THE NON-UNIFORMITY OF IMAGING DEVICES

FIELD OF THE INVENTION

The present invention relates to imaging devices, and in particular, to a method for compensating non-uniformity of imaging device response.

BACKGROUND INFORMATION

Image sensors are widely used in devices such as camcorders and digital cameras. Generally, an image sensor comprises a pixel array where each pixel has a photosensitive area. According to one type of image sensor, the pixels have photodiodes that operate according to photoelectric principles. Stated differently, each photodiode captures a portion of the instant light that falls on the pixel array and converts it into an electrical signal. The electrical signals converted by the photodiodes then can be used to recreate the scene captured in the instant light.

To further aid in the understanding of the invention, a complimentary metal oxide semi-conductor (CMOS) image sensor will be used as an example. FIG. 1 illustrates a pixel of the CMOS sensor. The pixel 10 of the CMOS sensor is formed on a silicon substrate 12 and comprises a photosensitive area 14 such as a photodiode. The pixel may be formed using photo-lithographic techniques. A color filter 16 is placed on top of the photosensitive area 14 that allows one primary color (e.g., red, green or blue) to pass through to the photosensitive area 14. The color filter 16 may be applied to the pixel using existing commercial color filter array (CFA) materials. To increase the photosensitivity of the photosensitive area 14, a micro-lens 18 may be formed over the photosensitive area 14 and the color filter 16. The pixel 10 further comprises other semiconductor devices such as transistors which process the electrical signal generated by the photosensitive area. Therefore, generally, the photosensitive area occupies a portion the overall pixel area.

One of the problems associated with an image sensor is that because the photosensitive area occupies a portion of the pixel, each pixel has an acceptance angle in which the photosensitive area is responsive to the instant light falling on the pixel. Stated differently, only instant light that falls up to a certain angle normal to the surface of the pixel will be detected by the light sensitive area of the pixel. Another problem associated with the image sensor is that the lens covering the pixel does not uniformly pass the instant light to the light sensitive area of the pixel. Stated differently, deformities and impurities in the lens absorb a portion of the light that passes through it at different levels for the various lenses on the various pixels.

The mentioned problems, including others, cause the image sensor to have a response that is not the same for all pixels even when a uniform illuminating light has been applied to the image sensor. For example, under a uniform illumination, due to the limitations described above, the readouts obtained from the pixels around the image sensor center is higher than the readouts near the image sensor periphery. Such phenomena is undesirable in that the captured images would have a non-uniform appearance, even though such is not the case in the original scene. The phenomena is more noticeable in the case where the scene has a uniform or simple background. Therefore, it is desirable to alleviate this perceptual non-uniformity and to improve the overall image quality.

SUMMARY

A method and apparatus for compensating non-uniformity of imaging device response is described. A plurality of locations on the imaging device is selected. The light intensity for each of the selected locations is measured. The measured light intensities are normalized using a reference light intensity and the normalized light intensities are stored in a memory.

Additional features, embodiments, and benefits will be evident in view of the figures and detailed description presented herein.

DETAILED DESCRIPTION

The present invention describes a method and apparatus for compensating the non-uniformity of imaging device. According to one embodiment, the method may comprise two main steps: (1) characterizing the non-uniformity imaging device, and (2) compensating the non-uniformity of the captured image. Both the characterization and compensation of the imaging device to non-uniformity may be performed in a linear intensity space (i.e., the readout of each pixel is linearly proportional to the input illumination level if the imaging device has an ideal uniform response). Although the invention will be described using interpolated RGB domain, the invention can be used to compensate the non-uniformity responses of imaging devices using different types of color filter array (CFA) patterns.

When implemented in software, the elements of the present invention may be code segments to perform the necessary tasks. The software may be stored in a processor readable medium. The processor readable medium generally includes any medium that can store or transfer data. For example, the processor readable medium includes an electronic circuit, a semiconductor memory device, a read only memory (ROM), a Flash memory, a magnetic disk, an optical disk and like devices.

The term "imaging device" as used throughout the specification, should be construed to cover cameras, camcorders as well as display devices, such as monitors and display panels. For the purposes of describing the invention, an image sensor will be used.

Figure 1:
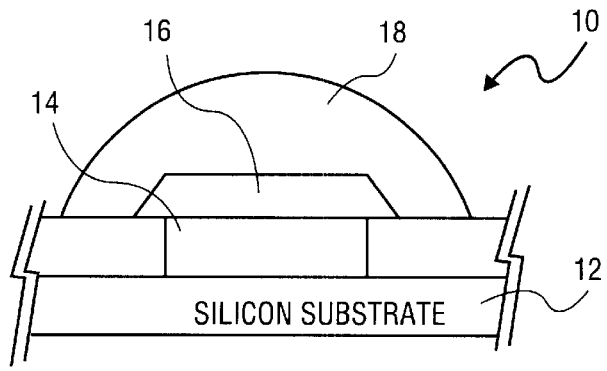
FIG. 1 is a schematic diagram of a pixel in an image sensor.
Figure 2:
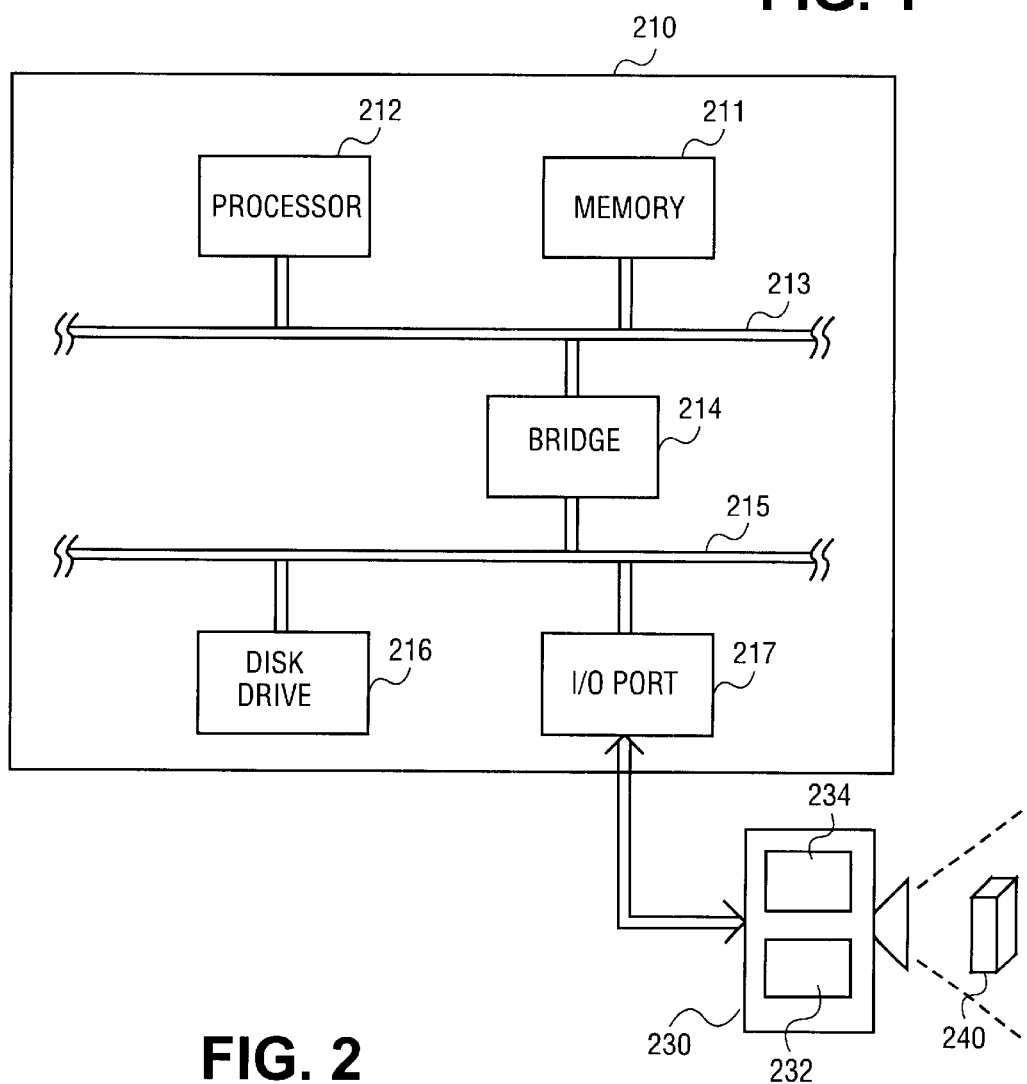
FIG. 2 is a schematic diagram of a computer system with a coupled camera in which an embodiment of the invention may be implemented.

FIG. 2 illustrates a computer system 210 which may be a personal computer (PC) to which a camera 230 is coupled. The camera 230 may be a digital video camera or any image capturing device to capture an image of an object, for example, illustrated as object/scene 240. According to a certain camera, the image sensor of the camera converts the captured image into electrical signals, which are processed by the image-processing circuit 232. Generally, captured images are compressed and processed by an image-processing circuit 232 so that they can be efficiently stored in an image memory unit 234 which may be random access memory (RAM), Flash memory or other storage devices such as a magnetic disk and so forth.

According to a certain computer system, the system 210 has a system bus 213, which facilitates information transferred to and from the processor 212 and memory 211. The system 210 also has a bridge 214 which couples the system bus 213 to an input/output (I/O) bus 215. Coupled to the I/O bus 215, there are a plurality of various I/O devices of which a disk drive 216 and I/O port 217 are illustrated. According to one system, the I/O port may be a universal serial bus (USB) port to which the camera 230 is tethered. The computer system described above is but one example, illustrated to aid in the understanding of the invention.

| | |
|---|---|
| LM = left margin width | N = number of sampling points in each row |
| RM = right margin width | M = number of sampling points in each column |
| TM = top margin width | SW = sampling width = (total number of image columns-LM-RM)/(N-1) |
| BM = bottom margin width | SH = sampling height = (total number of image rows-TM-BM)/(M-1) |
| (m,n) = sampling point index | (for m = 0, 1, 2, . . . , M-1 and n = 0, 1, 2, . . . , N-1) |
| (i,j) = actual image pixel location | |

Hence, the location of each sample pixel (m,n), denoted as $(i_m, j_n)$, can be determined by:

$$i_m = m \cdot SH + TM$$
$$j_n = n \cdot SW + LM \quad (1)$$

Figure 3:
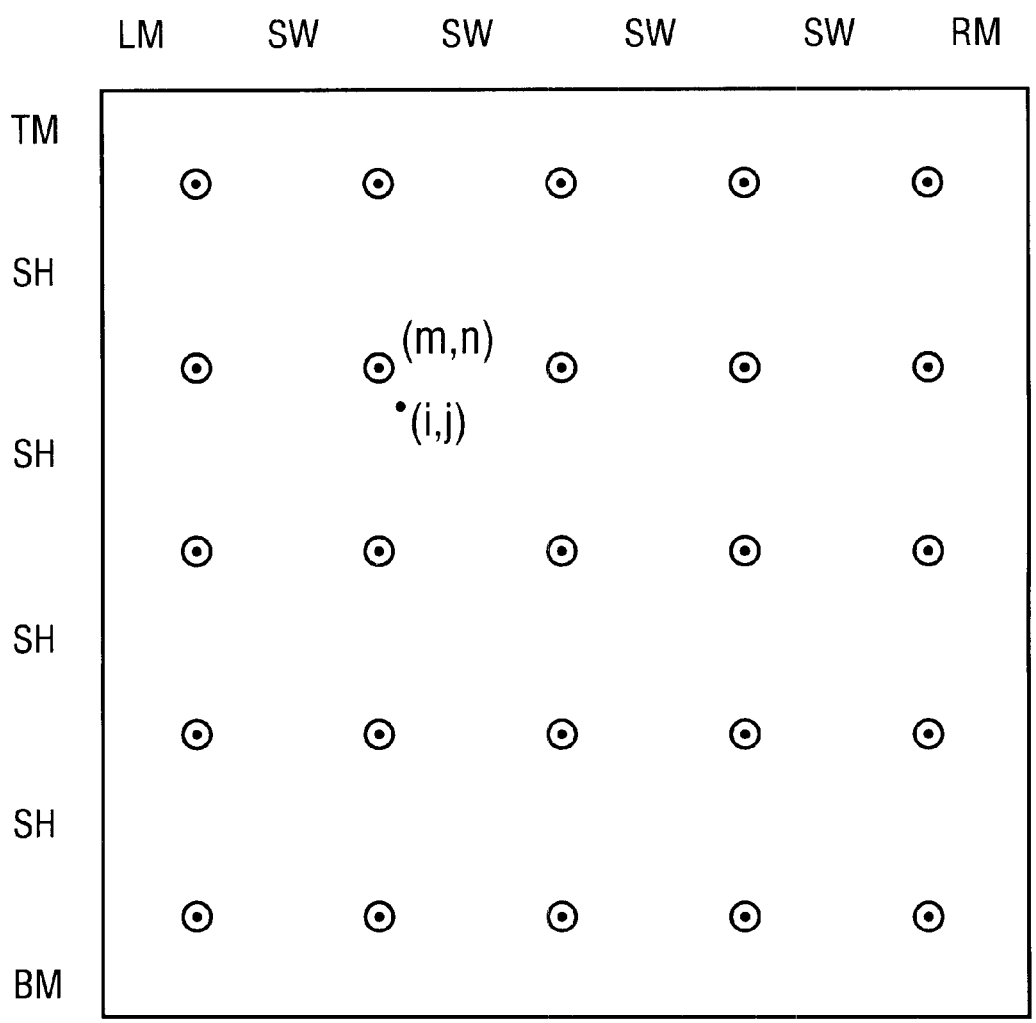
FIG. 3 is a schematic diagram of an image sensor to aid in the understanding of the invention.
Figure 4:
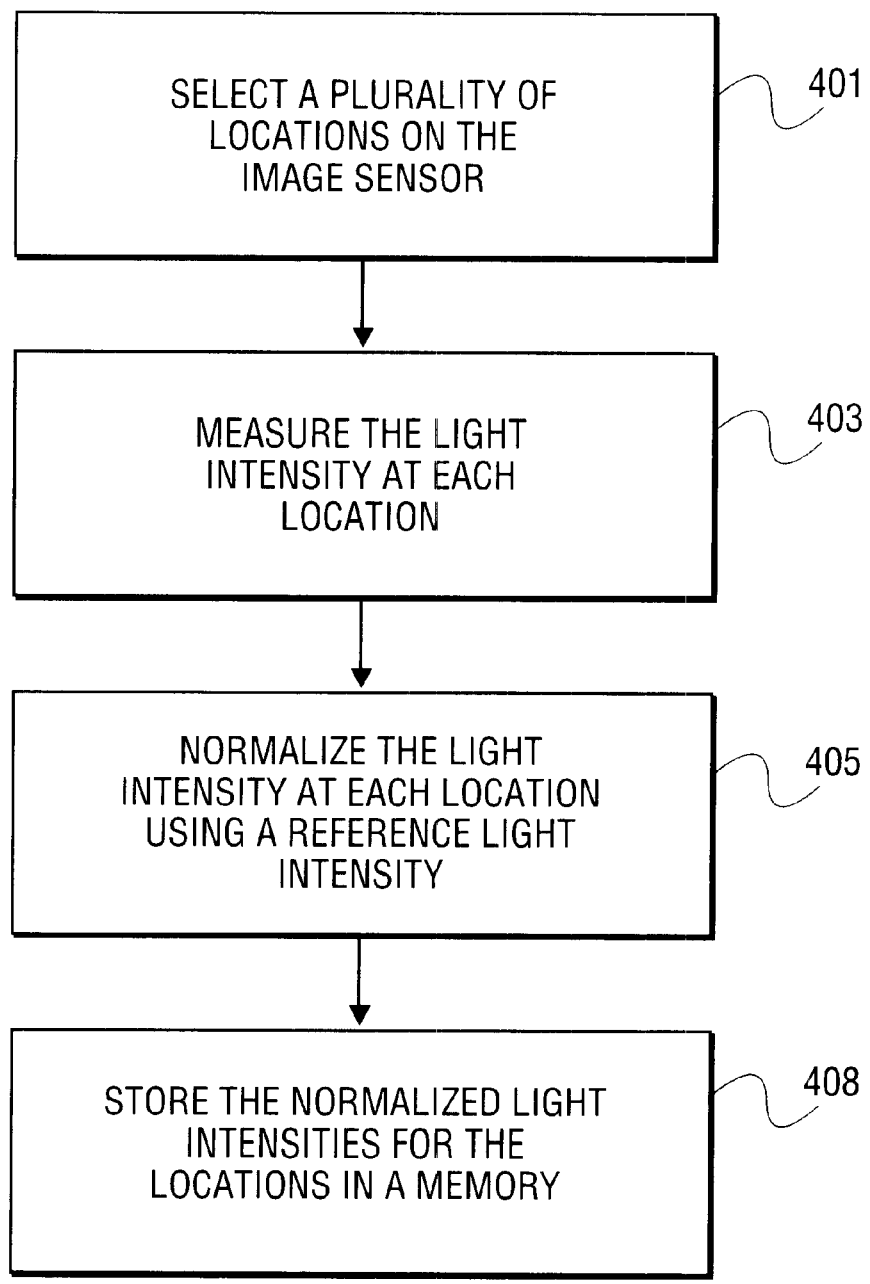
FIG. 4 is a flow chart showing the characterization of the non-uniformity of the image sensor in accordance with an embodiment of the invention.

In block 403, according to one embodiment, the light intensity of the locations for each color plane (e.g., red, blue, or green color plane) are measured. This procedure is performed because the light response of the pixels may be different in the various color planes. In one embodiment, the pixel at the selected location is used to measure the light intensity. In an alternative embodiment, for each location, a number of pixels within a small window around the selected location are selected for sampling. The light intensity of each pixel is sampled. From the sampled light intensities of the number of pixels, a mean/median value is determined for the number of sampled pixels which constitutes the light intensity for the location. Let $Q_c(m,n)$ denote the light intensity for a location in a color plane. 25 $Q_c(m,n)$ values will be obtained for each color plane because there are 25 locations. In block 405, the obtained values of $Q_c(m,n)$ are normalized. In one FIG. 3 illustrates an image array used to aid in the understanding of the invention. The image array comprises a plurality of pixels adapted to capture incident light and to convert the light into electrical signals. For reasons as described above, limitations within the pixels cause the captured image to be non-uniform even though the original scene was uniform. FIG. 4 in conjunction with FIG. 3 show the characterization of the non-uniformity of the image array response to a uniform illumination in accordance with one embodiment of the invention. As illustrated in FIG. 3 and as block 401 in FIG. 4, a plurality of locations are selected on the image array which are used to determine the light intensity for that location. In this example, 25 locations are selected although more or less locations may be used to achieve a desired result. Using a selected a number of locations, a map of responsivity indices, which characterize the camera non-uniformity response at a number of sample locations is determined. As shown in the FIG. 3, the selected locations may be identified as: embodiment a predetermined arbitrary value is used to normalize the 25 $Q_c(m,n)$ values. In an alternative embodiment, from the 25 $Q_c(m,n)$ values, the maximum light intensity value $Q_c^{max}$ is obtained. The responsivity index, $x_c(m,n)$, which specifies the non-uniformity of the camera response at the sample location (m,n) can be determined as:

$$x_c(m,n) = Q_c(m,n) / Q_c^{max} \quad (2)$$

As depicted in block 408, the responsivity indices at all the sample locations may be stored in a memory such as the image memory unit 234 (see FIG. 2) in the camera 230. When the camera 210 is connected to the computer system 210, the responsivity indices may be transferred from the camera 210 to the memory 211 or disk drive 216 of the computer system 210.

Figure 5:
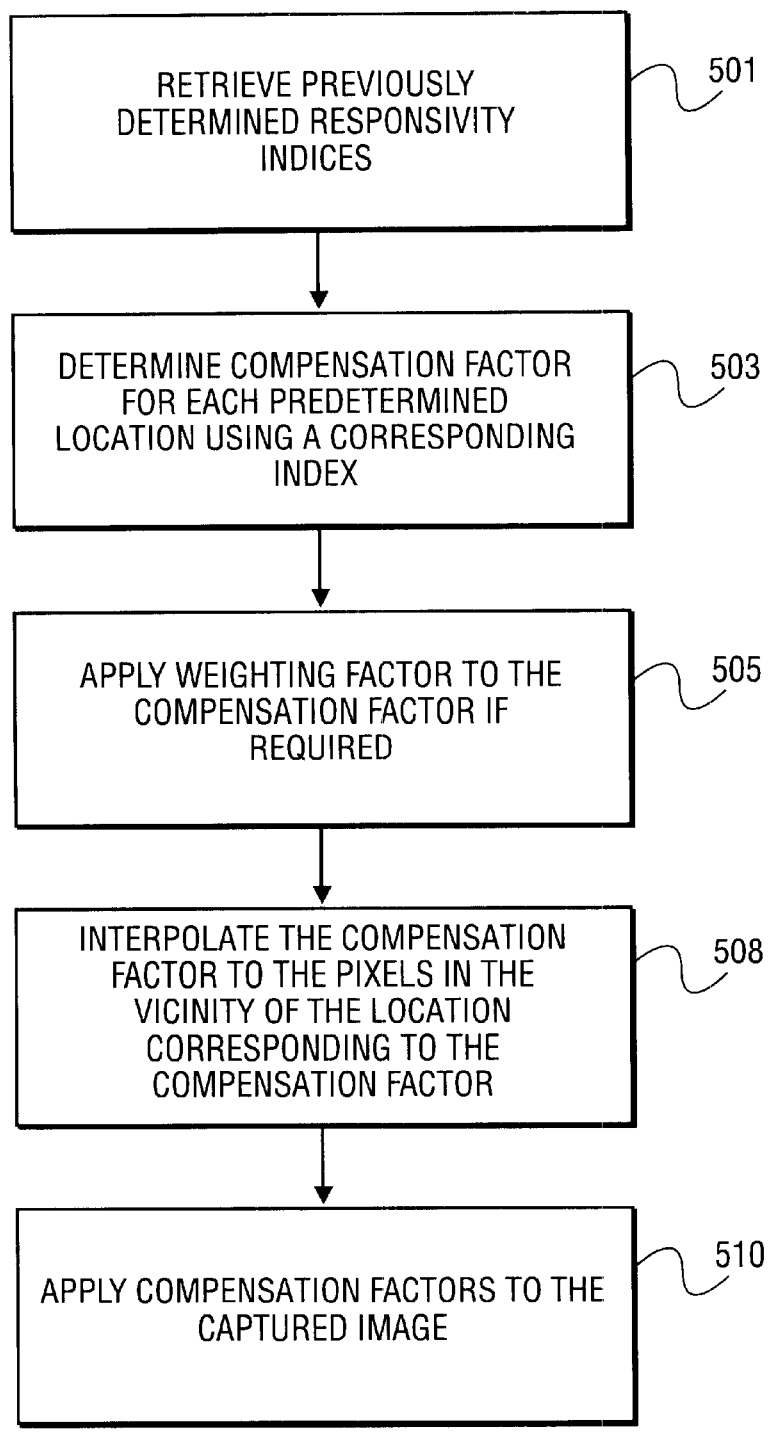
FIG. 5 is a flow chart showing the compensation of the non-uniformity of the image sensor in accordance with an embodiment of the invention.

FIG. 5 is a flow chart that describes the steps of compensating an image for non-uniformity of the image sensor in accordance with an embodiment of the invention. When an image is captured by the camera, the image is compensated for non-uniformity using the responsivity indices previously determined according to the procedure described above in one embodiment. In block 501, the responsivity indices are retrieved from the memory of the computer system. The responsivity indices are used to compensate the image for non-uniformity. In block 503, the compensation factor is determined. For each color plane c, the compensation factor, $s_c(m,n)$ is determined for each location (m,n) as:

$$s_c(m, n) = 1/[x_c(m, n) + (1-w) \cdot (1-x_c(m, n))] \quad (3)$$

In certain instances as depicted in block 505, a weighting factor w is applied to the compensation factor as shown in equation (3). The weighting factor w ranges from 0 to 1 and controls the extent of the non-uniformity compensation to avoid over-boosting the random noise at pixels near image periphery. Thus, when w is closer to 0, less uniformity correction is performed to the portion of the image affected by the compensation factor. If w is closer to 1, a full uniformity correction is performed. The weighting factor w can be determined, in one example, according to the sensor noise characteristic and sensed illumination level using a light sensor incorporated into the camera. For example, if the light sensor indicates that the scene to be captured is bright, the brighter the scene, the more uniformity correction may be performed without generating perceptible artifacts due to noise.

In block 508, in one embodiment, bi-cubic interpolation, such as the one described in:

"Numerical Recipes in C: The Art of Scientific Computing" Second Edition, William H. Press, Sail A. -Teukolsky, William T. Vetterling, and Brian P. Flannery, Cambridge University Press, 1992

"Cubic Convolution Interpolation for Digital Image Processing", Robert G. Keys. IEEE Trans. on Acoustics, Speech and Signal Processing, Vol:. 29, No. 6, December 1981, pp.1153–1160.

is then used to interpolate $s_c(m,n)$ to obtain the compensation factor, $r_c(i,j)$, for every image pixel (i,j) in each color plane c. For example, let (i,j) be an image pixel enclosed by the sample pixels {(m,n),(m,n+1),(m+1,n), (m+1,n+1)}. The compensation factor, $r_c(i,j)$, using the bi-cubic interpolation as described in "Cubic Convolution Interpolation for Digital Image Processing" determined by $$r_c(i, j) = \sum_{p=-1}^{2} \sum_{q=-1}^{2} g_c(m+p, n+q) \cdot u\left(\frac{i - i_{m+p}}{SH}\right) \cdot u\left(\frac{j - j_{n+q}}{SW}\right) \quad (4)$$

where $g_c(m,n) = s_c(m,n)$
   for $m=0,1,2,\ldots,M-1$ and for $n=0,1,2,\ldots,N-1$ $g_c(-1,n) = 3s_c(0,n) - 3s_c(1,n) + s_c(2,n)$ $g_c(M,n) = 3s_c(M-1,n) - 3s_c(M-2,n) + s_c(M-3,n)$
   for $n=0,1,2,\ldots,N-1$ $g_c(m,-1) = 3s_c(m,0) - 3s_c(m,1) + s_c(m,2)$ $g_c(m,N) = 3s_c(m,N-1) - 3s_c(m,N-2) + s_c(m,N-3)$
   for $m=0,1,2,\ldots,M-1$ $g_c(-1,-1) = 3s_c(0,-1) - 3s_c(1,-1) + s_c(2,-1)$ $g_c(M,-1) = 3s_c(m-1,-1) - 3s_c(M-2,-1) + s_c(M-3,-1)$ $g_c(-1,N) = 3s_c(0,N) - 3s_c(1,N) + s_c(2,N)$ $g_c(M,N) = 3s_c(M-1,N) - 3s_c(M-2,N) + s_c(M-3,N)$ are coefficients computed from the compensation factors of the neighboring sample pixels; $(i_{m+p}, j_{n+q})$ is the location of the sample point $(m+p, n+q)$ as defined in equation (1); and $$u(v) = \begin{cases} 1 & 0 = |v| \\ 1.5|v|^3 - 2.5|v|^2 + 1 & 0 < |v| < 1 \\ 0 & 1 + |v| \\ -0.5|v|^3 + 2.5|v|^2 - 4|v| + 2 & 1 < |v| < 2 \\ 0 & 2 < |v| \end{cases}$$

is the kernel for the bi-cubic interpolation. The compensation factors of the boundary pixels outside the grid of the sample locations shown in FIG. 3 are set to the same as their nearest compensation factors determined from equation (4) namely:

$r_c(i,j) = r_c(i_o,j)$
   for $i < i_o$ and for $j = j_o, j_o+1, j_o+2, \ldots, j_{N-1}$ $r_c(i,j) = r_c(i_{M-1},j)$
   for $i < i_{M-1}$ and for $j = j_o, j_0+1, j_o+2, \ldots j_{N-1}$ $r_c(i,j) = r_c(i,j_o)$
   for $j < j_o$ and for $i = 0,1,2,\ldots,$ $r_c(i,j) = r_c(i,j_{N-1})$
   for $j < j_{N-1}$ and for $i = 0,1,2,\ldots,$ Once the compensation factors have been determined, in block 510, the captured image is compensated as follows:

Multiply the R, G and B values of each image pixel by its corresponding compensation factors i.e., if $P_c(i,j)$ and $P_c'(i,j)$ are the before and after compensation pixel values in color plane c, then $$P_c'(i,j) = r_c(i,j) \cdot P_c(i,j) \quad (7)$$

For a cropped image, the relative locations of the image pixels and the computation of the compensation factor at each pixel can be modified accordingly.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to regarded in an illustrative rather than in a restrictive sense.

What is claimed is:

1. A method comprising:
    selecting a plurality of locations on an imaging device;
    measuring a light intensity for each of the selected locations;
    normalizing each measured light intensity using a reference light intensity; and
    storing the normalized plurality of light intensities in a memory;
    determining a compensation factor for the selected location on the imaging device using the stored normalized light intensity;
    interpolating the compensation factor to a group of pixels in the vicinity of the selected location; and
    correcting the non-uniformity of the group of pixels using the interpolated compensation factors.

2. The method as in claim 1, wherein measuring the light intensity for each of the selected locations further comprises:
    selecting a plurality of pixels at the selected location;
    measuring light intensities of the plurality of pixels
    determining a median value from the measured light intensities; and
    using the median value as the light intensity for the selected location.

3. The method as in claim 1, wherein using a reference light intensity includes using a maximum measured light intensity from the measured plurality o f light intensities.

4. The method as in claim 1, wherein the method is performed for a plurality of color plans associated with the imaging device.

5. A method comprising:
    retrieving previously stored indices from a memory wherein each index corresponds to a selected location on an imaging device;
    determining a compensation factor for the selected location on the imaging device using the stored index;
    interpolating the compensation factor to a group of pixels in the vicinity of the selected location; and
    correcting the non-uniformity of the group of pixels using the interpolated compensation factors.

6. The method as in claim 5, further comprising:
    multiplying the compensation factor by a weighting factor to adjust a non-uniformity compensation of a pixel.

7. The method as in claim 5, wherein the step of interpolating is performed using bi-cubic interpolation.

8. A processor readable medium which when executed by a processor causes the processor to perform a method comprising:
    selecting a plurality of locations on an imaging device;
    measuring a light intensity for each of the selected locations;
    normalizing each measured plurality of light intensity using a reference light intensity; and
    storing the normalized plurality of light intensities in a memory;
    determining a compensation factor for the selected location on the imaging device using the stored normalized light intensity;
    interpolating the compensation factor to a group of pixels in the vicinity of the selected location; and
    correcting the non-uniformity of the group of pixels using the interpolated compensation factors.

9. The processor readable medium as in claim 8, wherein measuring the light intensity for each of the selected locations further comprises:

selecting a plurality of pixels at the selected location;

measuring light intensities of the plurality of pixels determining a median value from the measured light intensities; and using the median value as the light intensity for the selected location.

10. The processor readable medium as in claim 8, wherein using a reference light intensity includes using a maximum measured light intensity from the measured plurality of light intensities.

11. The processor readable medium as in claim 8, wherein the method is performed for a plurality of color planes associated with the imaging device.

12. A processor readable medium which when executed by a processor causes the processor to execute a method comprising:

retrieving previously stored indices from a memory wherein each index corresponds to a selected location on an imaging device;

determining a compensation factor for the selected location on the imaging device using the stored index;

interpolating the compensation factor to a group of pixels in the vicinity of the selected location; and correcting the non-uniformity of the group of pixels using the interpolated compensation factors.

13. The processor readable medium as in claim 12, further comprising:

multiplying the compensation factor by a weighting factor to adjust a compensation of a pixel.

14. The processor readable medium as in claim 12, wherein the step of interpolating is performed using bi-cubic interpolation.

15. An apparatus comprising:

a first circuit to select a plurality of locations on an imaging device;

a second circuit to measure a light intensity for each of the selected locations;

a third circuit to normalize each measured light intensity using a reference light intensity; and a memory to store the normalized plurality of light intensities; and additional circuits to determine a compensation factor for the selected location on the imaging device using the stored normalized light intensity, interpolate the compensation factor to a group of pixels in the vicinity of the selected location, and correct the non-uniformity of the group of pixels using the interpolated compensation factors.

16. The apparatus as in claim 15, wherein the second circuit to measure the light intensity for each of the selected locations further comprises:

a fourth circuit to select a plurality of pixels at the selected location;

a fifth circuit to measure light intensities of the plurality of pixels a sixth circuit to determine a median value from the measured light intensities; and a seventh circuit to use the median value as the light intensity for the selected location.

17. The apparatus as in claim 15 wherein the third circuit uses a maximum measured light intensity from the measured plurality of light intensities to normalize the plurality of light intensities.

18. The apparatus of claim 15 wherein the apparatus is included in a computer system.

19. An apparatus comprising:

a first circuit to retrieve previously stored indices from a memory wherein each index corresponds to a selected location on an imaging device;

a second circuit to determine a compensation factor for the selected location on the imaging device using the stored index;

a third circuit to interpolate the compensation factor to a group of pixels in the vicinity of the selected location; and a fourth circuit to correct the non-uniformity of the group of pixels using the interpolated compensation factors.

20. The apparatus as in claim 19, further comprising:

a fifth circuit to multiply the compensation factor by a weighting factor to adjust a compensation of a pixel.

21. The apparatus as in claim 19, wherein the third circuit performs interpolation using bi-cubic interpolation.

22. The apparatus as in claim 19, wherein the apparatus in included in a computer system.

23. A method for reducing apparent non-uniformity of an electronic imaging system response, comprising:

retrieving a plurality of responsivity values for an image sensor of said system, each value represents intensity of incident light at a different, selected location of the image sensor during a capture of a first digital image of a uniform scene using the sensor, the plurality being a fraction of a total number of pixels that constitute the first digital image;

using each of the plurality of responsivity values, interpolating a plurality of compensation factors that are to be applied to compensate a plurality of pixels, respectively, in a second digital image captured using the system, the plurality of pixels are produced by a vicinity of the selected location of the image sensor; and applying the plurality of compensation factors to the second digital image.

24. The method of claim 23 wherein the plurality of responsivity values and the plurality of compensation factors are for the same color plane, the method further comprising:

retrieving a plurality of responsivity values for each additional color plane of the image sensor;

interpolating a plurality of compensation factors that are to be applied to compensate a plurality of pixels for each additional color plane of the image sensor; and applying the plurality of compensation factors to pixel values in each additional color plane to completely compensate the second digital image.

25. The method of claim 23 wherein the plurality of responsivity values represent a plurality of equispaced locations of the sensor.

26. The method of claim 25 wherein each of the plurality of responsivity values is an average of a plurality of pixel values taken from a vicinity of the selected location.

27. The method of claim 26 wherein the plurality of responsivity values have been normalized, prior to being retrieved, to a reference value.

28. The method of claim 27 wherein the reference value is a maximum of the plurality of pixel values that are used to compute the average.

* * * * *

UNITED STATES PATENT AND TRADEMARK OFFICE
CERTIFICATE OF CORRECTION

PATENT NO.   : 6,392,216 B1
DATED        : May 21, 2002
INVENTOR(S)  : Yap-Peng Tan It is certified that error appears in the above-identified patent and that said Letters Patent is hereby corrected as shown below:

Column 3,
Line 14, move the following starting with the table "LM=" to line 48 "normalized. In one" and insert it after column 3, line 67 "identified as:".

Column 6,
Line 28, delete "o f", insert -- of --.

Signed and Sealed this

Twenty-sixth Day of November, 2002

Attest:

Attesting Officer

JAMES E. ROGAN
Director of the United States Patent and Trademark Office